United States Patent [19]

Hettinger et al.

[11] Patent Number: 4,548,912
[45] Date of Patent: Oct. 22, 1985

[54] MICROSPHERICAL CATALYSTS

[75] Inventors: William P. Hettinger; H. Wayne Beck, both of Russell, Ky.

[73] Assignee: Ashland Oil, Inc., Ashland, Ky.

[21] Appl. No.: 494,609

[22] Filed: May 16, 1983

Related U.S. Application Data

[63] Continuation-in-part of Ser. No. 140,221, Apr. 14, 1980, abandoned.

[51] Int. Cl.4 .................. B01J 21/16; B01J 29/06; B01J 35/08
[52] U.S. Cl. ........................... 502/68; 502/8; 502/84; 502/527
[58] Field of Search ......................... 502/8-10, 502/527, 64, 68, 84

[56] References Cited

U.S. PATENT DOCUMENTS

| | | | |
|---|---|---|---|
| 3,140,253 | 7/1964 | Plank et al. | 252/455 Z |
| 3,867,308 | 2/1975 | Elliott, Jr. | 502/68 X |
| 3,978,269 | 8/1976 | Martin | 252/477 R |
| 4,022,715 | 5/1977 | Bornfriend | 252/477 R |
| 4,094,922 | 6/1978 | Bartek et al. | 502/527 X |
| 4,126,579 | 11/1978 | Flaherty, Jr. et al. | 502/68 |
| 5,153,539 | 5/1979 | Herrington et al. | 502/527 X |

Primary Examiner—Carl F. Dees
Attorney, Agent, or Firm—Richard C. Willson, Jr.; Stanley M. Welsh

[57] ABSTRACT

A catalyst which is a hollow microsphere comprising an outer shell in which there are feeder pores and an active ingredient arranged within the shell. The microsphere has a diameter ranging from 20 to 120 microns and the shell has a thickness ranging from 0.1 to 20.0 microns. The active ingredient fills 1.0% to 100% of the void space within the microsphere.

11 Claims, 1 Drawing Figure

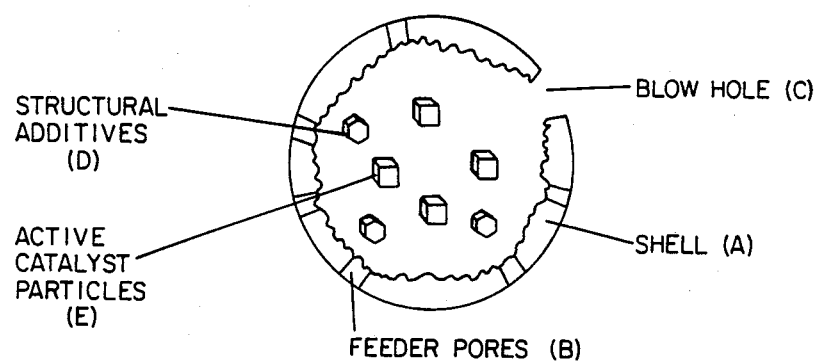

MICROSPHERICAL CATALYSTS

This application is a continuation-in-part of U.S. Ser. No. 140,221, filed Apr. 14, 1980 and now abandoned.

PRIOR ART

The prior art has often sought solutions to the problem of conversion of residual feedstocks which is, of course, aggravated by the inevitable build-up of metal on catalyst in amounts of up to 2,000 ppm, more commonly 5,000 ppm and sometimes bove 10,000 ppm based on the weight of the catalyst after regeneration and further complicated by the deposit of carbon-on-catalyst at a high rate owing to the Conradson Carbon content of such feedstocks which may be in the range of above 2, more often above 4 and frequently above 6 or more. Coke-on-catalyst may often build-up to 1, more commonly 1.5 and frequently above 2% by weight based on the weight of the catalyst.

Among the attempts to solve the problems to which the present invention is directed are two U.S. patents to the Davison Division of W. R. Grace: U.S. Pat. Nos. 4,126,579 and 3,867,308.

It is important to note that the above two patents generally utilize a pH in the range of roughly 2–4 for the preparation of their gel which is spray dryed to form their microspheres. In contrast, the present invention uses a higher pH of above 4, preferably above 5, and most preferably about 5 to 6. This provides a better pore structure and, in preferred embodiments, causes a blow hole to form through the wall of the microsphere.

Preferably at least about 70%, more preferably 80% and most preferably 90% or more of the individual microspheres will have such blow holes which permit the more easy and more rapid ingress and egress of the feed materials to and from contact with the catalytically active element of this two-element catalyst.

Thus, in preferred embodiments of the present invention, adjustment of the pH to the range of 4 to 6 provides a mixture which is ready to gel but also provides sufficient time for the mixing in of the catalytically active elements which are to be entrapped in the microspheres and sufficient time for nearly immediate spray drying. Spray drying at elevated temperatures provides both the cavity and the preferred blowhole which promotes contact between the feed and the catalytically active entrapped zeolite element.

Stated differently, the present invention delays the gelling until the slurry is in the spray dryer and minimizes the contact time between the zeolite and the acid sol to avoid destruction of the crystalline microsphere material. This provides the present invention with the features of a loose active ingredient contained within a hollow microsphere, a feature unattained by the prior art known to the inventors.

These techniques of the present invention should be compared to U.S. Pat. No. 4,126,579 to Flaherty, et al. which apparently attempts to avoid encapsulation particularly in its column 2. Flaherty in its claims specifically requires that the sol and the slurry be rapidly mixed to obtain a rapidly gelling reactant mixture which is sprayed into a gaseous atmosphere with 100% relative humidity to form gel particles " . . . substantially completely gelled without removal of moisture therefrom."

The Elliott, Jr. patent teaches preparing a silica sol by rapid addition of a mineral acid to sodium silicate, adjusting the pH to 1.8–3.0 to thicken the silica sol slurry, adding clay and zeolite components, spray drying, washing with water and rare earth exchanging if desired. Elliott, Jr. prepares a water slurry of a crystalline zeolite alumina silicate and adjusts the pH to about 3.0–4.5. The silica sol and the slurry prepared above are then mixed to prepare a spray dryer feed slurry having a pH of 2.8–4.0 and this feed is spray dryed before gellation occurs. This is contrast to the present invention's delay of gelling until the slurry is in the spray dryer to minimize the contact time between the zeolite and the acid solution in order to avoid destruction of the crystalline zeolite material. This provides the invention with its features of a loose active ingredient contained within a hollow microsphere.

Prior attempts by manufacturers are believed to have spray dryed great Salt Lake brine to make $MgCl_2$ microspheres which were too light for hydrocarbon conversion purposes. To overcome this surface tension agents were introduced to provide a more heavy, durable microsphere.

However, none of the prior art envisioned the combination of hollow microspheres with loose active ingredients which can "shake, rattle and roll" to renew the pore structure and the surface of the active zeolite element.

Catalysts of the present invention are made by first dispersing (not dissolving) the active ingredient comprising a zeolite into a sol-mix (a colloidal dispersion e.g. of Nalco colloidal silica) and then spray drying the composite thus formed. It has been discovered in the present invention that the active element is thus encapsulated into the shell of the hollow microsphere which results from spray drying.

Colloidal Al, Ti, alumina-coated silica can be substituted for the colloidal silica and combinations of the foregoing can be used.

A surface active agent is preferably added to the sol-mix to form better bubbles, thus stronger microspheres.

The Elliott, Jr. patent teaches preparing a silica sol by rapid addition of a mineral acid to sodium silicate, adjusting the pH to 1.8–3.0 to thicken the silica sol slurry, adding clay and zeolite components, spray drying, washing with water and rare earth exchanging if desired. Elliott, Jr. prepares a water slurry of a crystalline zeolite alumina silicate and adjusts the pH to about 3.0–4.5. The silica sol and the slurry prepared above are then mixed to prepare a spray dryer feed slurry having a pH of 2.8–4.0 and this feed is spray dryed before gellation occurs. This is contrast to the present invention's delay of gelling until the slurry is in the spray dryer to minimize the contact time between the zeolite and the acid solution in order to avoid destruction of the crystalline zeolite material. This provides the invention with its features of a loose active ingredient contained within a hollow microsphere.

DETAILED DESCRIPTION OF PREFERRED EMBODIMENT

The following is a description of a new class of catalysts, of unique properties, which consist of an outer shell which provides the structural dimensions of the catalyst; for example, microspherical catalysts and which shell encases or encompasses catalytic compositions of interests in a number of processes.

Further, the shell is to be so constructed as to provide a porosity of varying amounts and size, which porosity may act as an entrance to reactant molecules. These catalysts are considered to be unique catalysts, previously unavailable as a product of commerce.

In preparation of microspherical catalysts, generally two approaches are utilized. In the first approach, a homogeneous sol of catalytic composition is prepared, which sol is then homogenized and spray dried to produce a uniform microsphere containing catalyst material and surface evenly distributed throughout. In the second approach, a catalyst binder or matrix material is combined with an active catalyst, such as for example in the case of zeolite and clay containing cracking catalysts, wherein the active catalyst (zeolite) is uniformly distributed throughout the sol, or matrix of the catalyst is a similar manner.

In the second approach, wherein the active ingredient is uniformly incorporated within the sol, the sol and active ingredient are homogenized and spray dried. In this case the result is a catalyst which is homogeneous only in terms of dispersion of the active ingredient and said active ingredient is enclosed within the sol matrix. Because of the intimate association of matrix and catalyst ingredient to a considerable extent the effectiveness of that catalyst is frequently reduced. In the case of the zeolite containing cracking catalysts; for example, this blockage might involve the "portal" surface area of the zeolite ("portal" surface area is a term used to describe the outer periphery of the crystalline sieve or zeolite). In this case the portal surface area is to some extent covered and blocked in the presence of the sol, thus reducing the effectiveness of the catalyst. Also, in the process of utilizing these catalysts the matrix tends to sinter around the active ingredient, thereby further reducing its functionality.

This invention describes a new approach to Catalysis, in which a microspherical catalyst is prepared, which microsphere contains the major catalyst ingredient encompassed in the internal volume of the catalyst. The material is loosely held so that portal surface is not blocked or the blockage is greatly reduced, the "portal" surface continually and easily regenerated, and reacting molecules continue to have easy accessibility to the active catalyst ingredient.

Furthermore, these catalysts can be prepared in such a manner so as to be entirely devoid of any active catalyst binder or matrix, if so desired.

In preparing the shell, which shell is then to be utilized to contain the "mobilized" or "mobile" internal catalyst ingredients, a number of approaches can be utilized. Generally speaking, one may utilize as a shell forming component, any inorganic material, colloidally dispersed or dissolved, which upon spray drying forms a hard crust or shell. The shell resembling or being best described as analogous to an empty egg shell.

The formation of a hollow sphere and the problems connected therewith and means to avoid them are described in two U.S. Pat. Nos. 3,975,283 and 3,989,472, issued to Hettinger and Braithwaite in 1976, and which are directed to avoiding hollow spheres of $MgCl_2$.

By means of spray drying and with or without a blowing agent, it is possible to prepare a hollow microsphere of varying wall thickness, the thickness to be determined by the desirable characteristics of the catalyst and to be composed of desirable material in terms of structural characteristics and/or catalyst or co-catalyst properties.

In order to provide a catalyst with a hollow configuration but containing the active ingredients internally, the active ingredient is combined with the slurry and spray dried in a similar manner.

Now, however, it has been unexpectedly found that these heavier super-colloidal range particles and/or those particles bordering on the colloidal range (which is one-tenth to one micron) surprisingly have been found to be retained within the center of the hollow microsphere. These hollow microspheres which form the present catalysts are filled with catalyst ingredients. In some cases microspheres which were filled with catalyst ingredients have been opened and emptied, indicating the looseness with which the catalyst material is held within the hollow microsphere.

While the catalysts described herein are all related to cracking catalysts, we claim a family of catalysts wherein various matrices are utilized including silicon dioxide, aluminum oxide, titanium dioxide, zirconium dioxide, silica sols, alumina sols, titania, or zirconia sols, certain binder clays, and combinations thereof. The finished catalyst which incorporated these desirable shell forming inorganic ingredients are combined with catalytic materials such as the natural occurring or synthetic zeolites and also other structural forming ingredients such as kaolin clay, alumina trihydrate, titanium dioxide pigment and other materials of a nature such that they will assist the performance of the catalyst.

In FIG. 1, there is illustrated a catalyst structure according to the present invention. The catalyst is a microsphere which consists of a shell (A) in which there are feeder pores (B) and a blow hole (C). Within the shell (A) there are structural ingredients (D) and active catalyst particles (E).

Because of the possibility of actually preparing a loose, or unbound internal catalytic composition, this type of material also may provide a continually mobile, regenerating, or renewing surface which as a result has enhanced properties for utilization in catalytic cracking, reforming, hydrotreating, shale oil processing, and coal catalytic hydroliquefaction. Various combinations of active ingredients may also be encompassed in the gels as previously described, and the invention is not to be limited to zeolite catalysts or cracking catalysts.

The thickness of the shell (A), and the properties of the shell (A) in terms of thermal stability may also be varied so as to vary the properties of the catalysts. A given catalyst can be so designed that the entrance pores through the shell to the catalyst ingredient can be varied at will, and can be varied over the range of 20 to 10,000 Angstroms.

In many of these catalysts when prepared, the blow holes (C) are also formed and these blow holes (C) can represent an additional means for large molecules to enter the catalyst. This invention also encompasses the potential to also form or create blow holes (C), with at least one blow hole (C) per microsphere.

The shell (A) construction can also be varied by incorporating colloidal materials of varying sizes so that the pores or intertices between the colloidal particles control the ultimate pore size distribution, feeder pores or entrance pores to the catalyst.

In addition, control of outer pore structure or outer microspherical surface "portal" pores of the catalyst is also a way of allowing the blowing agent which can consist of steam and/or carbon dioxide and/or other blowing agents or decomposition products from such as ammonium carbonate, to escape and thereby either facilitate or eliminate the formation of blow holes.

These pores can also determine the relative thickness of the skin, relative to the total microsphere and in some cases where it is desired to make exceptionally thick shells in order to enhance the attrition resistance of this particle or to better contain the active ingredient, the use of antiforms may also be employed. The typical antiforms which are suitable antiblowing agents, are described in U.S. Pat. Nos. 3,975,283 and 3,989,472.

The present invention provides a new catalyst composition of matter which consists of a retainer shell of inorganic material, which is designed to withstand the operating severity of a catalytic application, and to represent a means of retention of active ingredients. This shell can also possess (a) characteristic feeder pores which may also give the catalyst specific selectivities, and (b) catalytic characteristics or co-catalyst characteristics of its own required in the finished catalyst.

The catalyst can also contain a catalyst active ingredient inside the sphere, which active ingredient can fill the void space within the sphere or to fill any degree of the emptiness of the hollow sphere from 1% to 100% of the void space internally.

The shells of the catalyst form microspheres in the range of 20 to 120 microns in diameter with shells the thickness of one-tenth to 20 microns in thickness. The internal void space to represent 10% to 90% of the total volume of the catalyst, and to contain the active ingredient and/or ingredients and/or pore structures in the amount of 5% to 100%.

In forming the present catalyst there is first a hollow, empty egg shell-like structure into which anything can be placed in any amount from just a pinch to complete filling of the hollow structure.

This internal catalyst and/or hole filling material may also be bound together to some degree with a suitable binder or may be unbound so that freedom of movement of ingredients internally are facilitated (i.e., somewhat analogous to a living cell).

The catalyst contains a shell consisting of silica, alumina, titania, zirconia, magnesia, and not to be limited to these but combinations thereof and also including gallia, germania, and other oxides normally considered thermally and/or hydrothermally stable.

The catlyst is especially useful as a reduced crude converter catalyst, but may also be used for catalytic cracking, reforming, hydrotreating, shale oil treating, and coal liquefaction. It may also be utilized in fluid bed, and slurry reactors for alkylation, isomerization, resid hydrotreating, hydrocracking, Fischer-Tropsch synthesis, conversion of methanol to high octane gasoline and any other application where such properties are considered superior.

The active ingredient may consist of such materials as zeolites, or other active ingredients such as platinum or other transition elements or combinations thereof, on alumina, cobalt molybdena or nickel molybdena on alumini and/or combinations thereof, and any catalyst deemed desirable in any of the aforementioned processes such as cobalt moly, nickel moly, nickel on alumina, Raney nickel, etc.

The feeder pores (B) to the internal catalyst surface, encompassed within the shell, to range from 20 to 10,000 Angstroms in diameter and to consist of or encompass structures which have dual or poly modal as well as single modal pore size distribution pores.

The shell (A) or matrix binder is 20% to 99% of the composition, and the catalyst ingredient (E) is 1% to 80% by weight of the total finished catalytic material. The structural ingredient (D) in conjunction with the catalyst ingredient (E) is present in the catalyst in an amount of 1% to 60%.

Internal catalyst particles and/or other pore modifying ingredients may consist of individual particles 100 Angstroms to 5 microns in diameter.

The differences between the present invention and the prior art can be seen by an examination of the specific examples which follow.

In Example 1 alum is added to promote formation of alumina to delay gelling so that the spray drying can occur at high temperatures so as to form both the cavity (required for inclusion of the catalytically active element of the invention) and the formation of blowholes which are preferred for their facilitation of contact between feedstock and the active element.

Example 2 illustrates the preparation of pure silica spheres in which the zeolite catalytically active elements can be entrapped.

Example 3 illustrates the use of a basic silica sol at a pH of about 10-12 which is dropped to a pH of 4.5-6.0. This avoids the gelling which occurs in the aforementioned Grace patents which teach staying below a pH of about 4. Gelling would, of course, preclude the addition of the catalytically active elements or would at least complicate there inclusion in the mix.

All of the Examples 1–3 illustrate that the present invention spray dries at elevated air inlet temperatures e.g. 400° to about 1200° C., more preferably from about 600° to about 1000° C. and most preferably from about 650° to about 900° C. at atmospheric pressure (reduced pressure could be used with somewhat lower temperatures) in order to form the hollow spheres with a blowhole in most, if not all, of the spheres. This blowhole has a diameter preferably of 5,000 to 50,000, more preferably 7,000 to 30,000 and most preferably 10,000 to 20,000 Angstroms, and promotes contact between the feed and the catalytically active element entrapped within the microsphere.

EXAMPLE 1

(Preparation of catalyst element within an outer shell according to the invention.)

1. Into a mixing mill are added 12 liters (l) of tap water, 1.2 l of concentrated sulfuric acid and 0.96 kg of $Al_2(SO_4)_3$ 18 $H_2O$. 2. With mixing 9.0 l of "N" brand sodium silicate is added at a rate of 200 ml/minute to above solution from 1 to obtain a slurry of near 2.5 pH.

3. A clay slurry, previously made by mixing 11 l of 2 pH sulfuric acid solution with 11 kg of a fine Georgia kaolinite, is mixed into the silica and above solution along with 10 gm of $Na_4P_2O_7$.

4. The resultant slurry is mixed for 5 minutes until smooth to obtain a pH near 2.3 and a viscosity of about 1500 cps.

5. A zeolite mixture, previously prepared from 4 l of 2 pH sulfuric acid solution and 4 kg of NaY zeolite, are added to the slurry and mixed for 15 minutes at 100° F. to obtain a slurry with pH near 3.0.

6. The resultant slurry is spray dried at an air inlet temperature of 750° F. and outlet whose average particle size is near 65 microns.

7. Each kilogram of microsphere is washed three times with 3 l of 150° F. tap water and then exchanged at 150° F. twice with 4 l of $NH_4Cl$ solution made with 25 gm of $NH_4Cl$ per liter of water.

8. A rare earth exchange on each kilogram of microsphere is made at 150° F. for 15 minutes by adding 75 ml of concentrated rare earth chloride solution to 3 l of water.

9. The solids are washed with tap water at 150° F. using 3 liters per kilogram.

10. Finally, the catalyst is dried at 300° F. for at least three hours.

EXAMPLE 2

(Silica Spheres with or without the loose active element of the invention.)

1. Into a mixing mill are placed 12 l of tap water with 2.0 l of concentrated sulfuric acid to obtain an acid solution of near 1.0 pH and temperature of near 100° F.

2. While stirring, 15.0 l of "N" brand sodium silicate are added to the acid solution at a rate of about 100 ml/minute to obtain a slurry with pH near 2 and a temperature near 100° F. (If desired, 0.75 kg of NaY zeolite could be added.)

3. The slurry was spray dried at 750° F. air inlet, 250° F. air outlet.

4. The spray dried spheres were washed three times with 3.0 l of 150° F. water.

5. If zeolite is added in step 2, the solid is exchanged twice with 100 gns of NH4Cl in 4.0 l of water at 150° F. for 15 minutes.

6. After filtering, the spheres are washed with 4.0 l of 10 pH NH4OH solution.

7. Finally, the solids are washed three times with 150° F. water and dried at 350° F.

EXAMPLE 3

(Preparation of microspherical catalysts to using basic slurries, according to the invention.)

1. Into a mixing mill were added 7 l of tap water with 3.9 l of Nalco's 2327 colloidal silica. After mixing for five minutes, the pH was 9.3.

2. While stirring, 3.25 kg of a fine Georgia kaolinite was added so to maintain a smooth slurry at all times.

3. To the clay-silica colloid slurry as added a zeolite slurry previously prepared by mixing 4 l of a 9.5 pH NH4OH solution with 3.2 kg of a calcined, rare earth exchanged Y zeolite (CREY). After 5 minutes mixing, the resultant slurry had a pH of 4.9 and a viscosity of only 240 cps.

4. The slurry was spray dried at 750° F. air inlet temperature and 250° F. outlet temperature to produce microsphere whose average particle size was near 65 microns.

5. Each kilogram of microspheres was washed three times with 5 l of 150° F. tap water before drying at 300° F. for at least three hours.

What is claimed is:

1. A catalyst particularly suited for the conversion of residual hydrocarbon feedstocks derived from crude petroleum into hydrocarbon fractions useful as transportation fuels, said feedstocks comprising conradson carbon values of at least about 2.0 and containing a total of vanadium plus nickel of at least about 6 ppm or more, said catalyst being capable of maintaining substantial activity even in the presence of 2,000 ppm of metals deposited on the catalyst, based on the weight of the regenerated catalyst, said catalyst being regenerable by contact with oxygen-containing gases in a regeneration zone; said catalyst comprising in combination:
   A. A hollow microsphere having a shell comprising clay and having a hollow interior which connects with the exterior of said catalyst through at least one feeder pore; and
   B. A catalytically active ingredient selected from the group consisting of: a zeolite; platinum on alumina; cobalt molybdena, or nickel on alumina loosely contained within said interior void of said hollow microsphere.

2. A catalyst according to claim 1, wherein said hollow microsphere has a blow hole formed through said shell, said blow hole having a diameter of at least about 5,000 Angstroms.

3. The catalyst according to claim 1, wherein said microsphere has a diameter ranging from about 20 to about 120 microns.

4. The catalyst according to claim 1, wherein said shell has a diameter ranging from about 20 to about 120 microns.

5. The catalyst according to claim 1, wherein said feeder pores range from 20 to 10,000 Angstroms in diameter.

6. A catalyst according to claim 1, wherein said shell comprises a material selected from the group consisting of silicon dioxide, aluminum oxide, titanium oxide, zirconium dioxide, silica, alumina, titania, zirconium, magnesia and combinations thereof.

7. A catalyst according to claim 1, wherein the active ingredient is platinum or a combination thereof on alumina, cobalt molybdena or nickel molybdena alumina, or cobalt molybdena, nickel molybdena or nickel on alumina.

8. A catalyst according to claim 1, wherein said active ingredient fills from 1.0% to 100% of the void space within said microsphere.

9. A catalyst according to claim 1, wherein said shell is 20% to 99% of the catalyst composition.

10. A catalyst according to claim 1, wherein said active ingredient is 1.0% to 80% by weight of the catalytic material.

11. A catalyst according to claim 1, wherein the shell comprises kaolin clay, alumina trihydrate or titanium dioxide pigment.

* * * * *